US006981008B2

(12) United States Patent  
Tabuchi et al.

(10) Patent No.: US 6,981,008 B2
(45) Date of Patent: Dec. 27, 2005

(54) METHOD FOR DUPLICATING DATA OF STORAGE SUBSYSTEM AND DATA DUPLICATING SYSTEM

(75) Inventors: Hideo Tabuchi, Tokyo (JP); Akinobu Shimada, Tokyo (JP); Toshio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/685,743

(22) Filed: Oct. 14, 2003

(65) Prior Publication Data

US 2004/0078399 A1  Apr. 22, 2004

Related U.S. Application Data

(63) Continuation of application No. 09/698,809, filed on Oct. 26, 2000, now abandoned.

(30) Foreign Application Priority Data

Mar. 31, 2000 (JP) ............................. 2000-101168

(51) Int. Cl.$^7$ ................................................ G06F 7/00
(52) U.S. Cl. .................... 707/204; 707/200; 707/203; 709/213; 711/100
(58) Field of Search ............................. 707/200, 203, 707/204; 711/100; 709/213

(56) References Cited

U.S. PATENT DOCUMENTS

| | | | |
|---|---|---|---|
| 5,257,352 A | 10/1993 | Yamamoto et al. | |
| 5,390,327 A | 2/1995 | Lubbers et al. | |
| 5,446,871 A | 8/1995 | Shomler et al. | |
| 5,544,347 A | 8/1996 | Yanai et al. | |
| 5,555,371 A | 9/1996 | Duyanovich et al. | |
| 5,577,222 A * | 11/1996 | Micka et al. ............... | 711/112 |
| 5,592,618 A | 1/1997 | Micka et al. | |
| 5,615,329 A | 3/1997 | Kern et al. | |
| 5,720,029 A | 2/1998 | Kern et al. | |
| 5,734,818 A | 3/1998 | Kern et al. | |
| 5,742,792 A | 4/1998 | Yanai et al. | |

(Continued)

FOREIGN PATENT DOCUMENTS

JP  09-325917 A  12/1997

OTHER PUBLICATIONS

U.S. Appl. No. 09/526,948, filed Mar. 16, 2000, Tabuchi et al.

(Continued)

*Primary Examiner*—Shahid Alam  
*Assistant Examiner*—Hung Pham  
(74) *Attorney, Agent, or Firm*—Townsend and Townsend and Crew LLP

(57) ABSTRACT

In order to realize asynchronous type system assuring the consistency of data with the function of disk subsystems without the need of introducing new software to a host unit and without the deterioration of the performance of a main center, in a remote copy system which copies the data to the disk subsystems of the remote center for duplicating the data in the disk subsystems of the main center, the disk subsystems give serial numbers and times to the data together with writing said data to the storage devices in the disk subsystem and transfer said data to the other disk subsystems, and the other disk subsystems arrange the two or more data in the sequence of the serial numbers, decide the oldest time among the latest time given to each of the disk subsystems communicating among the disk subsystems and the data given with the time not later than the decided oldest time are the objects of writing to each of the disk storage devices.

13 Claims, 6 Drawing Sheets

U.S. PATENT DOCUMENTS

| | | | |
|---|---|---|---|
| 5,799,141 | A | 8/1998 | Galipeau et al. |
| 5,845,328 | A | 12/1998 | Maya et al. |
| 5,870,537 | A | 2/1999 | Kern et al. |
| 5,893,140 | A | 4/1999 | Vahalia et al. |
| 5,937,414 | A | 8/1999 | Souder et al. |
| 5,949,970 | A | 9/1999 | Sipple et al. |
| 6,044,444 | A | 3/2000 | Ofek |
| 6,052,799 | A | 4/2000 | Li et al. |
| 6,157,991 | A | 12/2000 | Arnon |
| 6,161,165 | A | 12/2000 | Solomon et al. |
| 6,173,293 | B1 | 1/2001 | Thekkath et al. |
| 6,178,521 | B1 | 1/2001 | Filgate |
| 6,185,659 | B1 | 2/2001 | Milillo et al. |
| 6,260,124 | B1 | 7/2001 | Crockett et al. |
| 6,324,654 | B1 | 11/2001 | Wahl et al. |
| 6,408,370 | B2 | 6/2002 | Yamamoto et al. |
| 6,415,373 | B1 | 7/2002 | Peters et al. |
| 6,446,175 | B1 | 9/2002 | West et al. |
| 6,535,967 | B1 | 3/2003 | Milillo et al. |
| 6,535,994 | B1 | 3/2003 | Kedem |
| 6,539,462 | B1 | 3/2003 | Mikkelsen et al. |
| 6,615,332 | B2 | 9/2003 | Yamamoto et al. |
| 2001/0010070 | A1 | 7/2001 | Crockett et al. |
| 2003/0182526 | A1 | 9/2003 | Mikkelsen et al. |
| 2004/0068628 | A1 | 4/2004 | Suzuki et al. |
| 2004/0088484 | A1 | 5/2004 | Yamamoto et al. |
| 2004/0199737 | A1 | 10/2004 | Yamamoto et al. |

OTHER PUBLICATIONS

U.S. Appl. No. 09/513,932, filed Feb. 29, 2000, Tabuchi et al.

*IBM 3990/9390 Storage Control Introduction*, 9th Edition, IBM Corporation, pp. 23-28 and 78-89 (Oct. 1996).

"Digital Storage SCSI Bus Extenders/Converters and UltraSCSI Hubs version 2.0," pp. 7.1-7.5, Digital Equipment Corporation (Mar. 1998).

"Digital Equipment Announces StorageWorks: Capacity Breakthrough for DSSI Systems Customers," Digital Equipment Corporation press release (Mar. 1994).

* cited by examiner

METHOD FOR DUPLICATING DATA OF STORAGE SUBSYSTEM AND DATA DUPLICATING SYSTEM

CROSS REFERENCE TO RELATED APPLICATIONS

This application is a continuation application of U.S. patent application Ser. No. 09/698,809, filed Oct. 26, 2000 now abandon which in turn is related to and claims priority from Japanese Patent Application Reference No. 2000-101168, filed Mar. 31, 2000.

BACKGROUND OF THE INVENTION

The present invention relates to a storage subsystem storing data for a computer to refer to and to update, and more particularly to the method of duplicating the data held by a storage subsystem and a data duplicating system.

Companies and financial institutions are known to have both computer centers and backup computer centers preparing for the disasters of earthquake, etc. In systems which have backup facilities, the distances between the main computer centers and the remote computer centers are from a hundred kilometers to several hundreds kilometers apart geometrically, and the data are held in disk subsystems installed in the main centers and the remote centers with the duplicating. Systems having so called remote copy functions, wherein writing data generated at the disk subsystem of the main center are transferred to the disk subsystems of the remote center and the transferred same data are written into the disk subsystems of the remote center, have been already realized. The remote copy functions are classified into a synchronous type and an asynchronous type.

The synchronous type means a processing procedure that, when an update (writing) instruction is issued from the host computer (host unit) in the main center to the disk subsystem, the completion of the update processing is reported to the host unit of the main center after the instructed update (writing) to the disk subsystem of the remote center is completed if the instructed object is the object of the remote copy function. In this case, time delay is generated by transmission time caused by the performance of data transmission lines connecting between the main center and the remote center according to geometrical distances.

On the contrary, the asynchronous type means a processing procedure that, when an update (writing) instruction is issued from the host unit in the main center to the disk subsystem, the completion of update processing is reported to the host unit immediately after the completion of update processing at the disk subsystem in the main center, if the object of the instruction is the object of the remote copy function, and the data update (reflection) to the disk subsystem of the remote center is executed asynchronously with the processing regarding to the main center. With the asynchronous type, the data update is completed within the processing time required in the main center and the time delay caused by the data storing into the remote center is not generated. Therefore, when the highest priority is to avoid the influence of the transmission time to the operation of the main center in the remote copy between the distant disk subsystems, the asynchronous type remote copy will be more preferable than the synchronous type remote copy.

With the asynchronous remote copy, the data of the disk subsystem of the remote center is not always the same with the data on the side of the main center. The data that has not been reflected on the side of the remote center may be lost when the main center loses the function by disasters. However, the accessing performance of the disk subsystem on the side of the main center can be maintained at similar level with that of the case where the remote copy function is not applied.

With such prior arts, there have been kinds of problems for achieving the remote copy function with the intervention of the host unit.

In the execution of the remote copy, an independent communication link connects between the disk subsystem of the main center and the disk subsystem of the remote center. That is, in the execution of the remote copy between the two or more disk subsystems of the main center and the two or more disk subsystems of the remote center, the configuration comprises two or more pairs of the disk subsystems connected by the independent communication links. In performing the backup of the main center having two or more disk subsystems by the remote center, there is a problem of maintaining the update sequence of the data among the two or more disk subsystems, that is "the maintenance of the consistency". In the asynchronous remote copy, it is unavoidable that the reflection of the updated data to the remote center delays from the time of actual update processing at the main center. However, the sequence of the update must be in conformity with that of the main center. At least, at the moment a user requests data at the remote center, the data maintained with the consistency must be stored at the remote center.

Generally, a database comprises a database main body, kinds of log information that record the history of data updates, and control information, and there are many cases of system design where each of the database main body, the kinds of log information, and the control information are stored in different disk subsystems for the security reason. As there is a relativity among the database main body, the kinds of log information and the control information, these log information and control information are supplemented or updated at the data update processing giving to that of the database main body for maintaining the consistency of the system. These series of update are executed in sequence with time intervals of the order of several microseconds at the shortest. If the sequence of the update is confused, the consistency of the information regarding to the sequence of the update may be lost leading to the total destruction of the database.

For example, if the update of the log information, etc. is executed after the update of the database at the main center, there is a possibility of the updated log information, etc. arriving at the remote center before the arrival of the updated information of the database main body depending on the circumstance of the above described communication links comprising the remote copy system. Therefore, there is a hidden possibility of generating the situation where the supplementing or updating of the log information, etc. at the remote center is executed in advance of that of the data base main body at the remote center. If the main center suffers from disasters at the state of logical unconformity where only the log information, etc. are supplemented or updated but the database main body relating to the log information is not updated, the database itself of the remote center cannot be of use. Therefore, there is a problem that the update of the data at the remote center must be executed with the same sequence of the sequence of the update of the data at the main center.

In case of realizing an asynchronous remote copy in the circumstance of both main center and remote center with two or more disk subsystems, such technologies are known that the host unit at the main center gives information related to the update sequence as a time stamp to the data when the host unit at the main center instructs the update of the data to the disk subsystem, and the host unit of the remote center executes the reflection processing of the update of the data to the disk subsystem of the remote center based on such time information. For example, the Japanese patent unexamined publication 6-290125 (U.S. Pat. No. 5,446,871 discloses such technology. The Japanese patent unexamined publication 6-290125 discloses the realization of a remote copy function with the intervention of a host unit. Specifically, by the cooperative operation of the operating system and the disk subsystems of the host unit on the side of the man center and the data mover software and the disk subsystems of the host unit on the side of the remote center, the issue and the transmission of the update sequence information and the reflective processing of the update data based upon the update sequence information are realized.

SUMMARY OF THE INVENTION

According to above described prior art, an asynchronous remote copy function is realized assuring the update sequence of the data between the main center and the remote center. However, this technology requires software for both of the host unit and the disk subsystem for realizing the asynchronous remote copy function and the cooperation between them. The dedicated new software has to be introduced; therefore, the introduction of dedicated new software, setting, inspection, and the review of system design caused by the increase of a load to a CPU will be generated for a user. Therefore, there has been a sort of a barrier to introduce the remote copy by the prior art as it requires a certain amount of introducing period and the cost of introduction. Actually, there is no realizing means of the remote copy by the prior art for a system, wherein the host unit cannot give the information regarding to the update sequence, such as time stamps, or the system having no structure of correcting internal clocks of two or more host computers, that are, especially, open systems. Notwithstanding the type of the host unit or host software, the consistency of the update sequence of the data must be maintained with the function of the disk subsystem only, for realizing asynchronous remote copy with the function of the disk subsystem only. In case the data that require the consistency of update sequence are dispersed being stored in two or more disk subsystems, there is a problem of lack of means to maintain the consistency of the update sequence among the two or more disk subsystems.

The object of the present invention is to realize an asynchronous remote copy function assuring the consistency of data with the function of the storage subsystem only without the need of introducing new software to the host unit, easy to introduce, and with minimum deterioration of the performance of the computer at the main center.

The present invention is the method of duplicating data of a system which is provided with a first storage subsystem group comprising two or more storage subsystems and a second storage subsystem group comprising two or more storage subsystems which store copies of the data of the first storage subsystem group, wherein the method of the duplicating the data is that the data being written into each of storage devices from each of the storage subsystems which belongs to the first storage subsystem group are given with serial numbers and times, the data are transferred through transmission lines to the storage subsystems which belong to the second storage subsystem group, the two or more data being received by each of the storage subsystems which belongs to the second storage subsystem group are arranged in sequence of the serial numbers, the oldest time is decided comparing the latest times given to each of the storage subsystems by the communication among the storage subsystems which belong to the second storage subsystem group, and the data given with the times earlier than the decided oldest time are the objects of data writing into the storage devices of the storage subsystems.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

The system of a preferred embodiment of the present invention will be explained as follows, with reference to the drawings.

Figure 1:
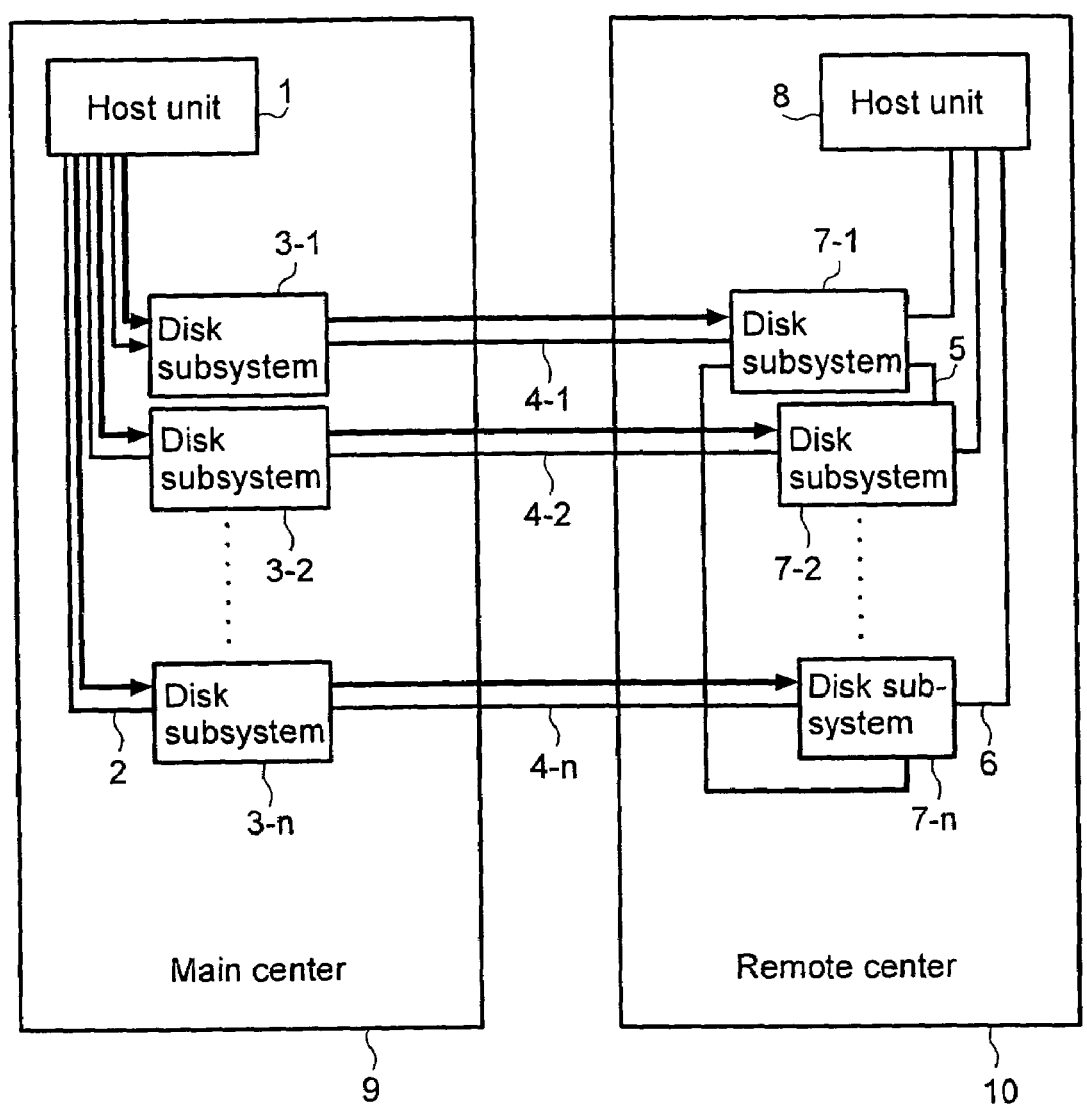
FIG. 1 is a diagram showing the total structure of the remote copy system of the preferred embodiment of the present invention.

FIG. 1 is a block diagram of a system that duplicates data between two data centers, each of which is provided with a computer. Two or more disk subsystems 3-1, 3-2, - - - 3-n on the side of a main center 9 and two or more disk subsystems 7-1, 7-2, - - - 7-n on the side of a remote center 10 are connected mutually without the intervention of host units 1 and 8, and a remote copy system that duplicates data between both centers is realized. As an example of the connection of the disk subsystems without the intervention of the host units 1 and 8, the connection utilizing Storage Area Network (SAN) can be cited, though the detail of it is not described here.

The host unit 1 at the main center 9 having a central processing unit (CPU) that performs data processing is connected with the disk subsystems 3-1, 3-2, - - - 3-n through an interface cable 2.

The structure comprises the disk subsystem 3-1 being connected with the disk subsystem 7-1 of the remote center through an interface cable 4-1, the disk subsystem 3-2 being connected with the disk subsystem 7-2 through an interface cable 4-2, and the disk subsystem 3-n being connected with the disk subsystem 7-n through an interface cable 4-n similarly. Hereinafter, one of the disk subsystems 3-1, 3-2, - - - 3-n or one of the disk subsystems 7-1, 7-2, - - - 7-n may be referred to as a disk subsystems 3 or a disk subsystems 7. It will be similar with other structure.

The interface cables 4-1, 4-2, - - 4-n will include optical fiber links driven by LED drive units and the links using optical fiber cables driven by an interface protocol generally called a fiber channel. Electric communication links, typical of which are a T3 network and an ATM network can be included in it. Therefore, between the disk subsystem 3 of the main center 9 and the disk subsystem 7 of the remote center 10 can be connected with general fiber channel switches, or can be connected with the T3 network, the SONET network, or the ATM network. Though not shown by FIG. 1, these are called as the interface cables 4 as these connecting configurations are feasible in the preferred embodiment of the present invention.

Any of the disk subsystems 7-1, 7-2, - - - 7-n being stored with the data which are the object of the remote copy inside the remote center 10 is connected with another disk subsystem being stored with the data which are the object of the remote copy inside the same center through an interface cable 5. In the preferred embodiment of the present invention, the disk subsystems 7 are formed with a loop configuration being connected sequentially as with connecting the disk subsystem 7-1 with the disk subsystem 7-2, the disk subsystem 7-2 with the disk subsystem 7-3, and the disk subsystem 7-n with the disk subsystem 7-1.

A host unit 8 is a central processing unit which is connected with the disk subsystems 7-1, 7-2, - - - 7-n at the remote center 10 through an interface cable 6 and executes the reference and the update to the disk subsystems 7-1, 7-2, - - - 7-n. The host unit 8 can execute the processing substituting a host unit 1 when the host unit 1 of the main center 9 cannot execute the regular functions by disasters or failures. Furthermore, the host unit 8 can execute the different processing from those of the host unit 1 of the main center 9 independent of the host unit 1 using the data stored in the disk subsystems 7-1, 7-2, - - - 7-n. However, the host unit 8 will not be necessary when the host unit 8 does not do any processing to the disk subsystems 7-1, 7-2, - - - 7-n.

FIG. 1 shows the system configuration that when the host unit 1 issues the data write instruction to the two or more disk subsystems 3-1, 3-2, - - - 3-n, the same data are stored into the two or more disk subsystems 7-1, 7-2, - - - 7-n inside the remote center 10 maintaining the consistency of the processing and the data update at the main center 9. Arrows in FIG. 1 indicate the flow of the data instructed for writing from the host unit 1.

Figure 2:
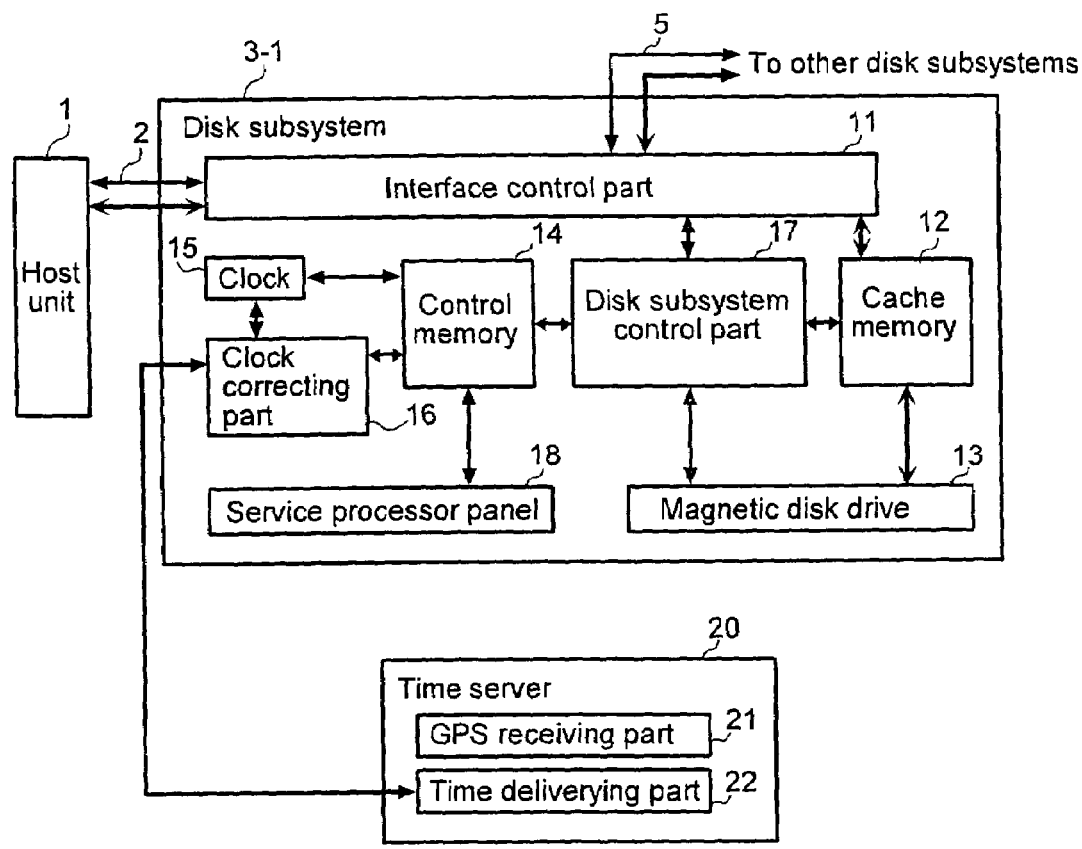
FIG. 2 is a diagram showing the inner structure of the disk subsystem of the preferred embodiment of the present invention.

FIG. 2 is a block diagram showing the inner configuration of the disk subsystem 3 and the disk subsystem 7. The disk subsystem 3 is provided with an interface control part 11 for transmitting and receiving the commands and the data transferred from the host unit 1 and for connecting with other disk subsystems 7, a cache memory 12 which stores the data being referred to or updated by the host unit 1, a magnetic disk drive 13 which is a magnetic media to store such data, a control memory 14 which stores the management information of the data, the status information of the remote copy, time information, etc., and a disk subsystem control part 17 which controls each element of these. The disk subsystem control part 17 operates by program control using a micro processor.

The disk subsystem 7 has the similar internal constitution. The disk subsystem 3 and the disk subsystem 7 can be configured as a disk subsystem having same internal constitution and functions so that the disk subsystem can operate as the disk subsystem 3 under the local mode and operate as the disk subsystem 7 under the remote mode. Each of the operating functions at the local mode and the remote mode is explained as follows. Generally a part corresponding to the magnetic disk drive 13 can be a storage device other than magnetic disk drive, and the disk subsystems 3 and 7 can be replaced with the units generally called as storage subsystems.

Each of the disk subsystem 3 is provided with a clock 15 and a clock correcting part 16. The clock correcting part 16 corrects the clock 15 occasionally based on the time information transferred from a time server located inside the unit cabinet of each of the disk subsystem 3 or closely enough at different position from each of the disk subsystems and keeps the time difference between the time that the time server transfers and the time of the clock 15 in each of the disk subsystems within the tolerance of several microseconds. The time server is an equipment provided with the function of receiving radio waves containing time information as a GPS and a radio controlled clock, and the function of transferring and delivering the received time information to each of the disk subsystems. If the time server is not provided with the radio wave receiving function, the function of generating time signal by the timer itself and the function of transferring and delivering it to each of the disk subsystems 3 will substitute it. If one of the disk subsystems 3 is provided with the function of the time server, an independent time server will not be necessary. A time server 20 shown by FIG. 2 is located close enough to the disk subsystem 3 and provided with a GPS receiving part 21 which receiving the information including time from satellites, the time signal acquiring part which acquires time from the received information, a time signal generating structure which generates time signal continuously by itself when the information cannot be received, and a time delivering part 22 which delivers the time information to the disk subsystems 3.

The frequency of executing the update processing to the disk subsystems 3 by the host unit 1 which is generally called a host computer will depend on each of the systems but with the high frequency case, the update processing may be executed in succession at the time intervals of several microseconds. The reason why the accuracy of the clock 15 of each of the disk subsystem 3 is required to be within the range of several microseconds is to allow the disk subsystem 3 to securely grasp the difference of the time of the update processing and to grasp the sequence of the update processing of the data based on the time of the update processing in case of the update processing is executed in succession at the time intervals of several microseconds. If the frequency of the update processing which is executed by the host computer to the disk subsystem 3 is with the time intervals shorter than several microseconds, then the accuracy of the clock 15 held by each of the disk subsystem 3 must be less than the time unit of the time interval of the processing.

Figure 3:
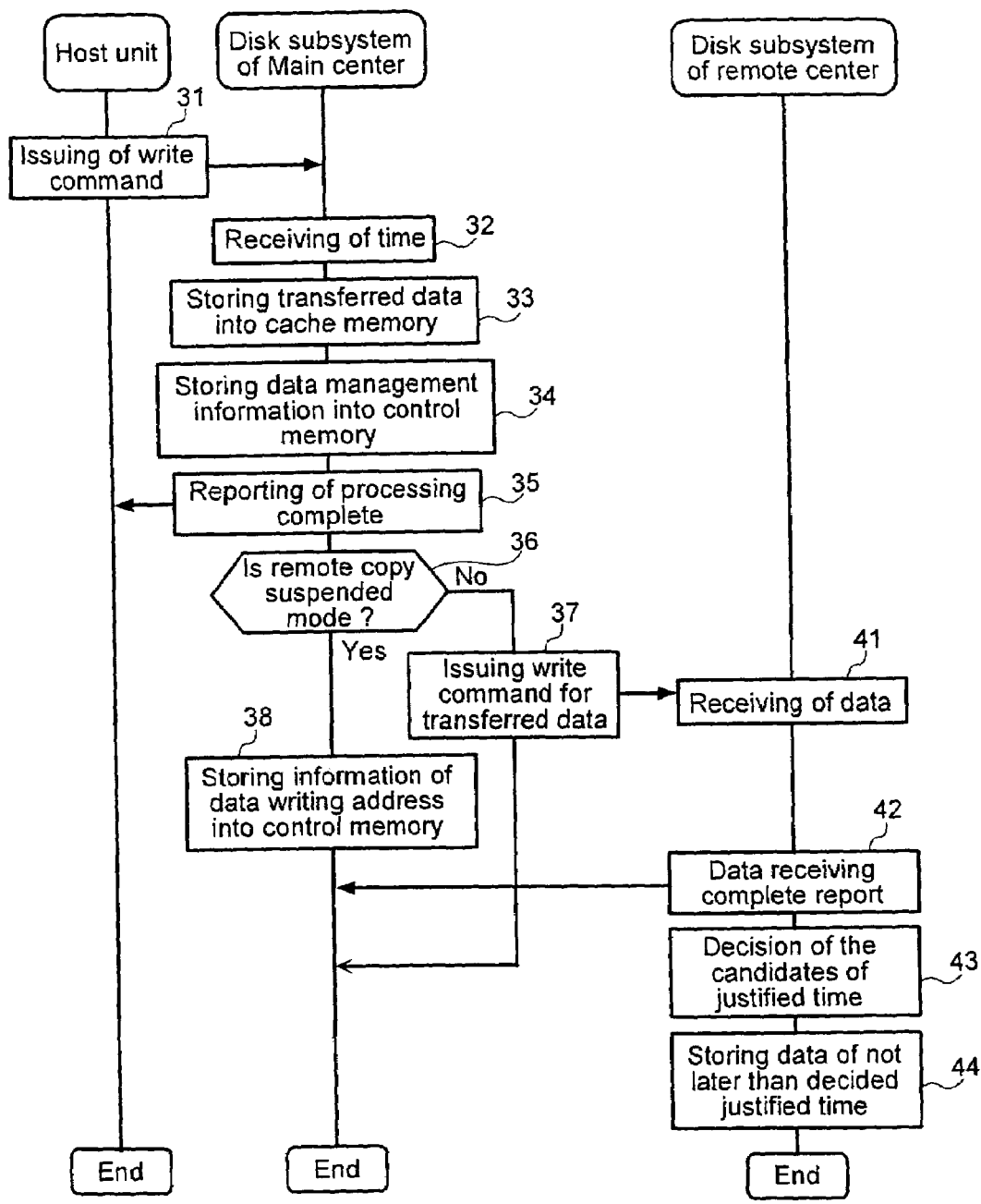
FIG. 3 is a flowchart showing the procedure of duplicating data from a disk subsystem 3 to a disk subsystem 7 of the preferred embodiment of the present invention.

FIG. 3 is a flow chart showing the procedure of the processing of duplicating the data covering the disk subsystem 3 and the disk subsystem 7. As the initial condition before the following processing, the result of the previous addition or update of the data are reflected between the disk subsystem 3 and the disk subsystem 7 and the duplication of the data must be completed. The host unit 1 issues the write request (hereafter called a write command) to the disk subsystem 3 (step 31). When the disk subsystem 3 receives the write command through the interface control part 11, the disk subsystem control part 17 of the disk subsystem 3 starts the processing based on the write command. Here, the write command indicates a command to transfer the instruction to write the data into the cache memory 12 and the write data itself. The disk subsystem control part 17 of the disk subsystem 3 obtains the time of the receipt of the write command from the clock 15 (step 32), stores the data into the cache memory 12 (step 33), and stores the management information of the data into the control memory 14 (step 34). The management information includes the address information of a writing address of the magnetic disk drive 13, the write command receipt time of the data, the serial number of the receipt of the write command, and a pointer to the data on the cache memory 12. Here, the serial number of the receipt of the write command is a series of numbers given to the write commands received by the disk subsystem 3. Then, the completion of the processing corresponding to the received write command is reported to the host unit 1 (step 35). The data stored into the cache memory 12 is recorded into the magnetic disk drive 13 afterwards; however, the detail is not described here as it is of the prior art.

The disk subsystem control part 17 issues the write command (step 37) to the connected disk subsystem 7 through the interface control part 11 and the interface cable 4 asynchronous with the processing corresponding to the write command from the host unit 1, when the remote copy is not in the suspending mode (step 36 No) referring to a control bit on the control memory 14. Here, the write command includes a command to transfer an instruction to write the data and the write data itself as is similar with the write command received from the host unit 1 and, further, includes the receipt time of the data and the serial number of the data receipt. When the remote copy is in the suspending mode (step 36 Yes), the address information of the data writing address of the magnetic disk drive 13 is stored into the control memory 14 inside the own disk subsystem 3 (step 38) and the write command is issued to the disk subsystem 7 of other party after the remote copy returns to a normal mode.

The disk subsystem 7 receives the write command issued from the disk subsystem 3 through the interface control part 11 (step 41). The write command includes the time of receipt of the data by the disk subsystem of the main center and the serial number of the receipt of the data by the disk subsystem of the main center adding to the data. The disk subsystem 7 starts the processing according to the received write command. The disk subsystem control part 17 of the disk subsystem 7 rearranges the received write commands in sequence of the serial number of the data receipt and checks the missing of the serial number, i.e. the missing of write commands. Then, the received data are stored into the cache memory 12 as "provisionary data", the management information of the data is stored into the control memory 14, and the completion report of the data receipt is sent to the disk subsystem 3 of other party (step 42).

Next, the disk subsystem control part 17 of the disk subsystem 7 selects candidates to determine the justified time among the data based on the time contained in the received write commands and decides the candidates of the justified time cooperating with other disk subsystem 7 (step 43). The decision of the candidates of the justified time will be explained later: When the justified time is decided in the manner as described above, the data having the receipt time not later than the justified time are stored into the cache memory 12 as "proper data" (step 44). The data stored into the cache memory 12 are recorded into the magnetic disk drive 13 afterward.

Figure 4:
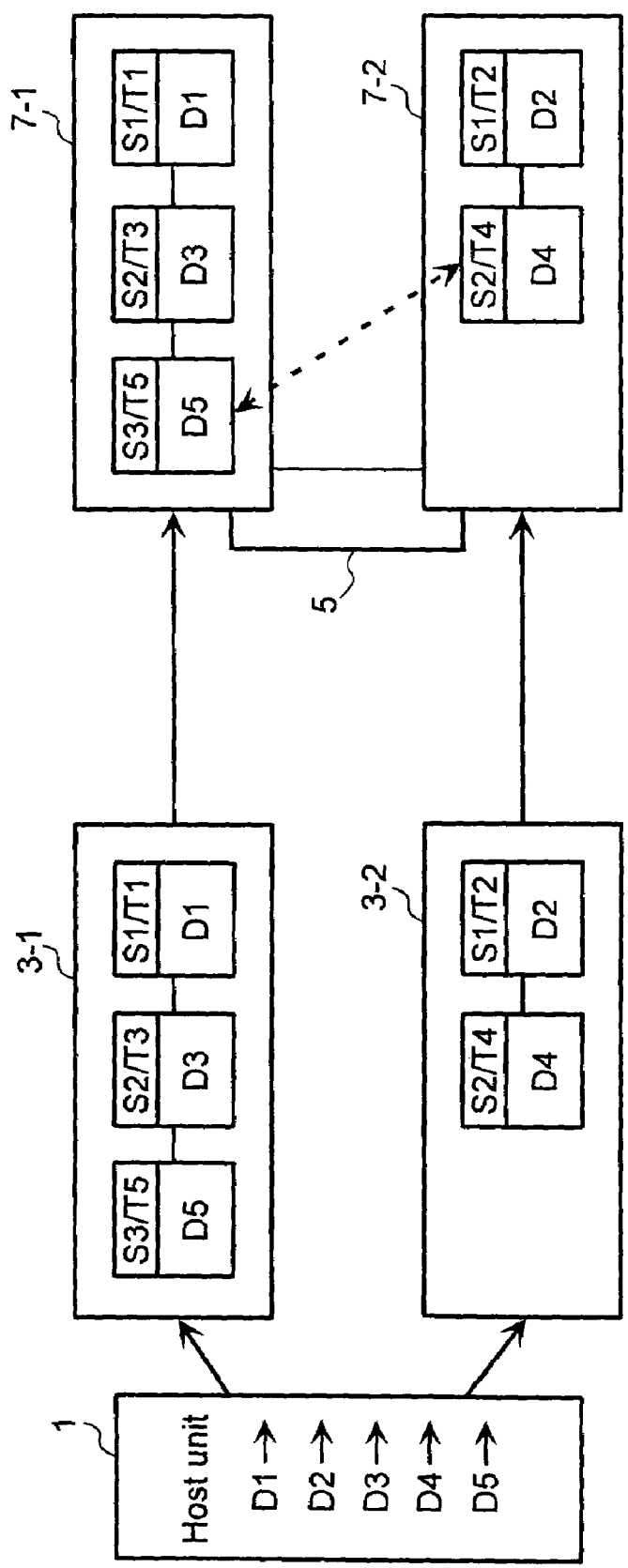
FIG. 4 is a diagram illustrating an example of the flow of the data given with the time of receipt and the serial number of the receipt till it is being remote copied of the preferred embodiment of the present invention.

FIG. 4 is a block diagram which explains with an example the flow of the data by the time the data given with the time of receipt and the serial number of receipt are remote copied. The host unit 1 being generated with five write data of D1, D2, D3, D4, and D5 in this sequence issues the write commands to the disk subsystem 3-1 and the disk subsystems 3-2 sequentially. The disk subsystem 3-1 receives the data of D1, D3 and D5, and gives the serial numbers of receipt and the time of receipt which are S1/T1, S2/T3, and S3/T5 to the data. On the other hand, the disk subsystem 3-2 receives the data of D2 and D4, and gives the serial numbers of the receipt and the time of receipt which are S1/T2 and S2/T4 to the data. The disk subsystem 3-1 issues write commands on each of the data to the disk subsystem 7-1 after storing the received data into the cache memory 12 in the sequence of the serial numbers. The disk subsystem 3-2 issues write commands to the disk subsystem 7-2 on each of the data after storing the received data into the cache memory 12 in the sequence of the serial numbers.

The disk subsystem 7-1 receives the data given with the serial numbers of receipt and the time of the receipt, and stores the data as the "provisional data" into the cache memory 12. The disk subsystem 7-2 receives the data given with the serial numbers of receipt and the time of the receipt, and stores the data as the "provisional" into the cache memory 12. Next, the time of the latest data D5 among the data being received by the disk subsystem 7-1 and the time of the latest data D4 among the data received by the disk subsystem 7-2 are compared between the disk subsystem 7-1 and the disk subsystem 7-2. Here, the data D5 and the data D4 are called as the candidates of the justified time. In this example, the time T4 given to the D4 is judged to be older than the time T5 given to the D5, so that the time T4 given to the data D4 is decided to be the justified time and the data D2 and D4 given with time not later than the justified time are reflected to the cache memory 12 as the "proper data". The data D1 and D3 given with time not later than the time T4 are reflected to the cache memory 12 as the "proper data".

As the result of above described processing, the data D5 will remain as the "provisional" and the data D5 will be reflected to the cache memory 12 at least after the reflection of the data D4 to the cache memory 12. As described above, by keeping the sequential order of the updates of the data D4 and D5, the recovery of the data and the resuming of the remote copy are enabled at the suspension of the remote copy caused by a failure. On the contrary, if the failure occurs after the data D5 is updated and reflected preceding the update and reflection of the data D4, generally there will be the possibility of data loss and the data recovery and the resuming of the remote copy will become difficult. On the other hand, the update sequences of the data D1 and D3 of the disk subsystem 7-1, and the data D2 and D4 of the disk subsystem 7-2, of which given time stamps are justified, will be the sequences of updates in the order of the data D1 and D3 of the disk subsystem 3-1 and the data D2 and D4 of the disk subsystem 3-2, and the sequential order of the updates can be maintained.

As above described, the serial numbers of receipt is the sequence of the updates inside the one disk subsystem 3, and, therefore, the numbers indicating the sequence of updates inside the one disk subsystem 7. The serial numbers of receipt are used also for the check of the data dropout. On the contrary, the time of the receipt is the numerical value which shows the sequence of updates covering two or more disk subsystems 3 and used for the decision of the justified time covering two or more disk subsystems 7.

Figure 5:
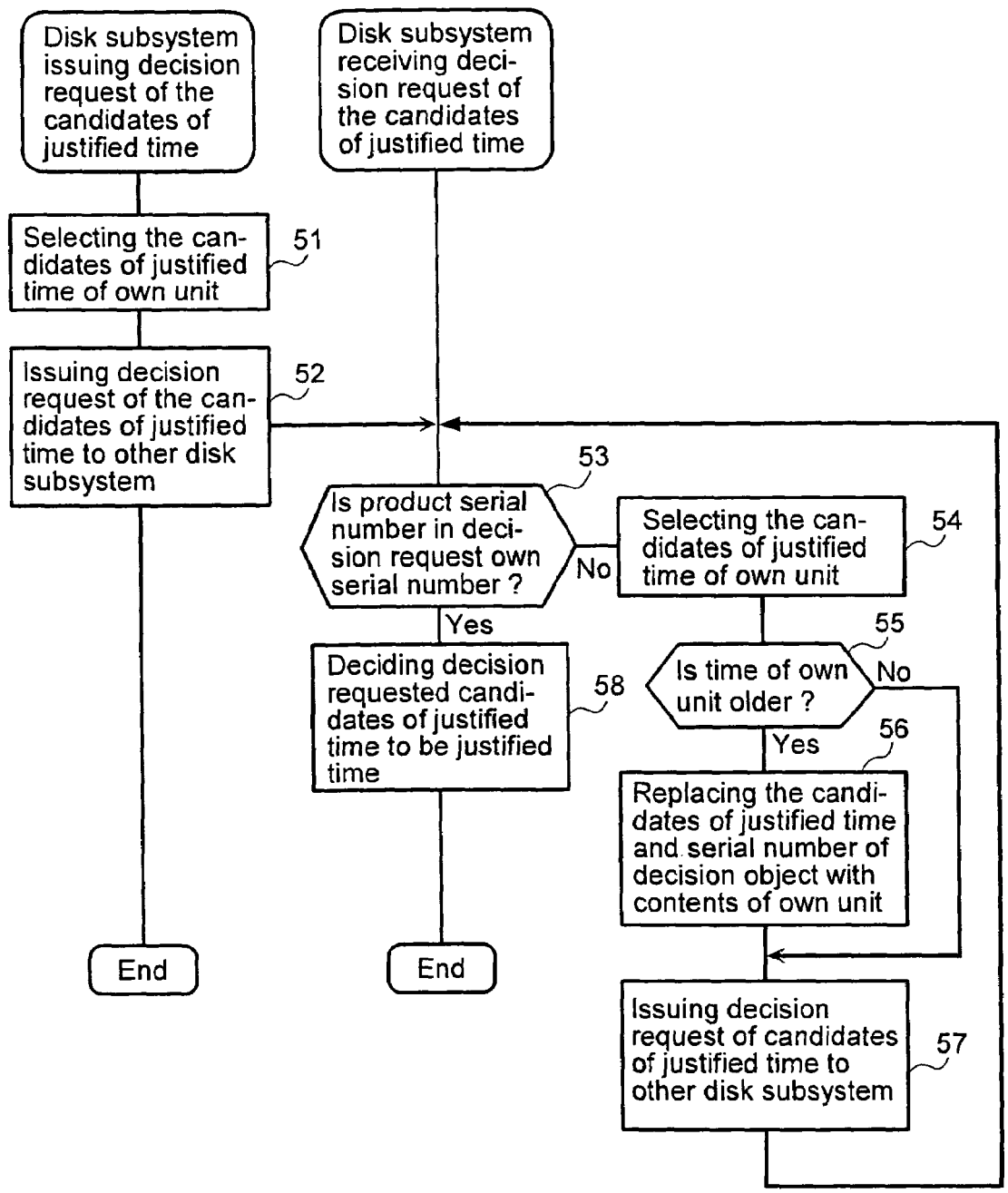
FIG. 5 is a flowchart showing the procedure of processing by the disk subsystem 7 regarding to the settlement of the justified time of the preferred embodiment of the present invention.

FIG. 5 is a flow chart showing the procedure of processing corresponding to the decision of the justified time in the disk subsystem 7. The disk subsystem control part 17 of the disk subsystem 7 which issues the decision request of the candidates of the justified time selects the candidates of the justified time in the own subsystem (step 51). That is, the write command given with the latest time of the receipt among the write commands arranged in the sequence of the serial numbers of the data receipt is selected. Then, the command is issued requiring the decision of the selected candidates of the justified time to the adjacent disk subsystem 7 which is connected by the interface cable 5 (step 52). This command includes the request indicating the decision request, the time given to the candidates of the justified time, and the unit production number (manufacturing number) of the disk subsystem 7. Furthermore, the time of the decision request is memorized inside the own control memory 14.

The adjacent disk subsystem 7 receives this command and judges whether the manufacturing number in the command meets the manufacturing number of the own unit (step 53). If the number is not the manufacturing number of the own unit (step 53 No), the candidate of the justified time in the own unit is selected according to the above described processing (step 54). Next, the received time of the candidates of the justified time and the time of the candidate of the justified time of the own unit are compared and judged (step 55). If the time of the own unit is older (step 55 Yes), the time and the manufacturing number of the candidates of the justified time that is the object of the decision are replaced with the time and manufacturing number of the candidate of the justified time of the own unit (step 56). If the time of the own unit is newer (step 55 No), jump to step 57. Then, the command is issued requesting the decision of the candidates of the justified time, of which content is replaced with the content of the own unit or as is received, to the adjacent disk subsystem 7 connected by the interface cable 5 (step 57). At this, the time of the decision request is memorized inside the own control memory 14. After the processing of the step 57, return to the step 53.

Receiving the decision request command and the manufacturing number in the command which meets with the manufacturing number of the own unit (step 53 Yes), the decision requested candidates of the justified time is decided as the justified time (step 58). That is, the candidate of the justified time is selected in each unit of the disk subsystems 7 and the oldest time among them is decided as the justified time.

Figure 6:
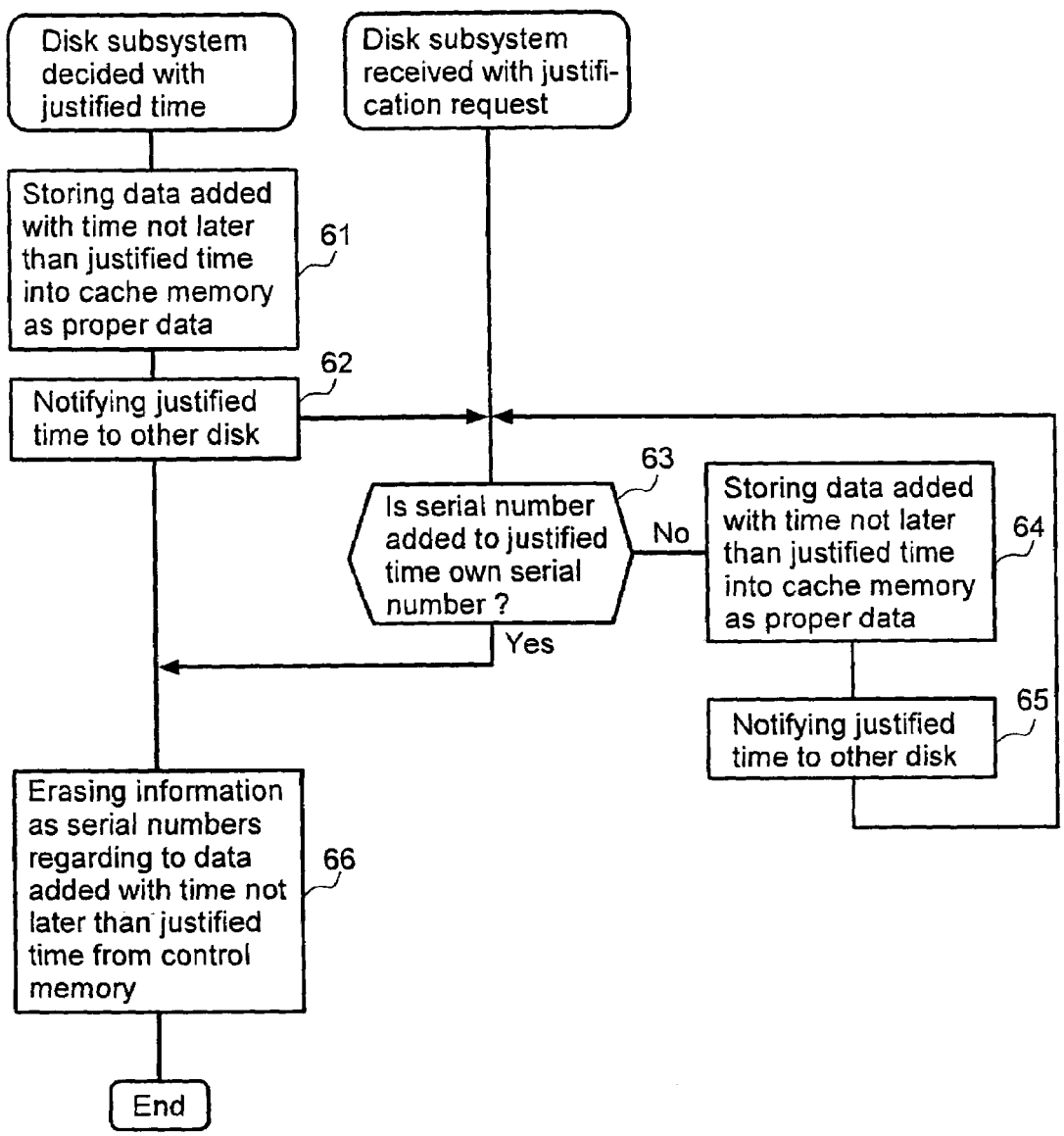
FIG. 6 is a flowchart showing the procedure of processing by the disk subsystem 7 regarding to the report of the justified time of the preferred embodiment of the present invention.

FIG. 6 is a flowchart showing the procedure of processing by the disk subsystem 7 regarding to the notification of the justified time. The disk subsystem 7 that has decided the justified time stores the data given with the time not later than the time of the justified time as "proper data" into the cache memory 12 (step 61). Next, a command informing the decided justified time is issued to the adjacent disk subsystem 7 (step 62). The command includes a request indicating the notification of the justified time, the decided justified time, and the manufacturing number of the disk subsystem 7. At this moment, the time of issuing the notification command is memorized into the own control memory 14.

Receiving the command, the adjacent disk subsystem 7 judges whether the manufacturing number in the command meets with the manufacturing number of the own unit (step 63). If it is not the manufacturing number of the own unit (step 63 No), the data received from the disk subsystem 3 and given with the time not later than the justified time are stored into the cache memory 12 as the "proper data" (step 64). Then, the justified time is notified to the adjacent disk subsystem 7 by transmitting the received command as it is received (step 65) and step 63 is resumed.

Receiving the justified time notifying command and the manufacturing number in the command which meets with the manufacturing number of the own unit (step 63 Yes), the information as the manufacturing numbers which became useless in the data given with the time not later than the justified time are erased from the control memory 14 (step 66). As the result of above processing, all of the write commands given with the time not later than the justified time over the two or more disk subsystems 7 are reflected to the data updates in each of the disk subsystems 7 and the new write commands of later than the justified time will remain as the object of selection for the next candidates of the justified time.

As for the start up of the decision request of the justified time, there is a method that a first start up disk subsystem 7 is determined beforehand and then, the disk subsystem 7 which is decided with the justified time starts up the next decision request of the justified time thereafter. There is another method that one of the disk subsystems 7 starts up the decision request of the justified time periodically. Any method that executes the decision of the justified time and the notification of the justified time periodically will be acceptable.

In the above described preferred embodiment, the product serial number is used as an identifier to discriminate each of the disk subsystems 7; however, it is not limited to the product serial number. Any identifier which can discriminate each of the disk subsystems 7 of the remote center can be used as the identifier.

In case the decision request command of the justified time issued by oneself does not return or the notification of the justified time is not received within the predetermined time after the issue of the decision request of the justified time, or in case the notification of the justified time issued by oneself does not return within the predetermined time after the issue of the notification of the justified time, the disk subsystem 7 is judged to be not able to have completed the decision of the time or the notification of the time caused by the occurrence of some failures and sets the control bit of the control memory 14 to the remote copy suspension mode to suspend the remote copy. As above described, when the remote copy cannot be continued by the failures on the side of the disk subsystem 7, the remote copy is suspended and the suspension of the remote copy is notified to the disk subsystem 3 of other party. Receiving the notification, the disk subsystem 3 sets the control bit of the control memory 14 to the remote copy suspension mode to suspend the remote copy and holds the above described transmission of the write command received from the host unit to the disk subsystem 7. When the remote copy cannot be continued by the failures on the side of the disk subsystem 3, the remote copy is suspended similarly and the suspension of the remote copy is notified to the disk subsystem 7 of other party. The disk subsystem 3 and the disk subsystem 7 detected the interrupted communication between the disk subsystem 3 and the disk subsystem 7 caused by the failure of the interface cable 4 suspend the remote copy similarly. At any time point, changing the control bit of the control memory 14 by the instruction from the service processor panel 18 of the disk subsystem 3 or the disk subsystem 7, the remote copy can be set to suspension mode, or the remote copy can be restarted by releasing the suspension mode.

The temporary suspension or resuming of the remote copy can be specified with a unit of a volume pair that is the minimum management unit of the memory region inside the disk subsystem at setting of the remote copy. Here, the volume pair indicates a pair of a volume inside a disk subsystem 3 which is the source of copying and a corresponding volume inside the disk subsystem 7 which is the destination of copying. Changing the state with the unit of a volume group is enabled by defining at least one volume pair as a volume group. Here, it is assumed that the data update inside the volume group does not affect other volume groups. In this case, the control bits in the control memory 14 are arranged for each of volume pairs or volume groups. The disk subsystem 3 judges whether the remote copy of the data is in suspended mode or not by referring to the volume or the volume group to store the data, and to the corresponding control bit of the control memory 14 at step 36.

Therefore, for example, in a system, wherein all of the data of the disk subsystem storing two or more business data are always duplicated, and in case there is a purpose on the side of remote center to use the data at the state of the end of the business regarding to a certain business, the business can be performed at the remote center, as the data at the end point state of the business can be maintained in the disk subsystem 7 of the remote center by setting the remote copy of the volume pair or the volume group, wherein the business data at the end point of the business are stored, to the temporary suspension mode.

When the temporary suspension mode is released, the disk subsystems 3 and 7 resume the remote copy and the write commands are transferred to the disk subsystem 7 for the data, which were written only into the disk subsystem 3 of the main center and the data, which is not completed with the justification in the disk subsystem 7 of the remote center during the temporary suspension. With this, the state, in which the regular remote copy can be executed, is restored.

Above described preferred embodiment of the present invention is a execution mode with the system configuration, wherein the disk subsystem 3 on the side of the main center 9 and the disk subsystem 7 on the side of the remote center 10 are connected with the correspondence of one to one. However, as the other preferred embodiment of the present invention, the system can be configured as two or more disk subsystems 3 are connected to one disk subsystem 7 and the remote copy is processed with the two or more disk subsystems 3, which are connected with this disk sub system 7. In this configuration, the disk subsystem 7 arranges the received write commands in sequence of the serial numbers of the data receipt for each production unit number of each of the disk subsystems 3 at receiving data in step 41, selects the latest time out of the time given to the write command of each of the disk subsystems 3, decides the oldest time as the candidates of the justified time comparing between the selected latest time and the time selected among the disk subsystems 3, and decides the justified time as described above.

As the other preferred embodiment of the present invention, the system can be configured as any of the disk subsystems 7 of the remote center is set as a master disk subsystem (generally, a master storage subsystem), and each of the disk subsystems in the remote center 10 other than the master disk subsystem is connected with the master disk subsystem mutually. In this configuration, the master disk subsystem acquires the candidates of the justified time held by the other disk subsystem itself of the remote center 10 by inquiring it. Then, the master disk subsystem decides the justified time by deciding the oldest time as the justified time comparing between the acquired candidate of the justified time and the candidate of the justified time owned by itself, and notifies the decided justified time to other disk subsystems of the remote center. Each of the disk subsystems 7 executes the justification of each of the data.

With this preferred embodiment of the present invention, executing the decision of the candidates of the justified time and the justification of the data according to the justified time by the disk subsystem 7 of the remote center 10, asynchronous remote copy is realized maintaining the consistency of the update sequence with the function of the disk subsystem, without the intervention of the host unit, without the processing periodically interrupting the remote copy, without arranging gateway subsystems to each of the main center 9 and the remote center 10 for maintaining the update sequence, and without the deterioration of the processing performance of the disk subsystem 3 of the man center 9.

According to the preferred embodiment of the present invention, the consistency of the update data is assured utilizing the time acquired from the clock held by the disk subsystem 3; therefore, asynchronous type remote copy can be realized without the intervention of the host unit, even with the system in which the data transferred from the host unit 1 to the disk subsystem 3 are not given with the time information.

The data are recorded in the disk subsystem 7 of the remote center 10 with the state maintaining the consistency of the data, if the function of the main center 9 is interrupted by the disasters of the main center or by the failures of devises. All of these are realized by the functions of the disk subsystems 3 and 7, and will not be a load to the processing capacity of the host unit 1. When the main center 9 suffers from disasters, the business can be restarted by the recovery work of such as the re-execution of jobs utilizing the data of the disk subsystems 7.

As above described, the present invention does not require the introduction of new software to the host unit, can assure the consistency of the update data in the range users expect with the functions of storage subsystems, and can realize the asynchronous type remote copy, which are easy to introduce and without the deterioration of the processing performance of the host computer.

The preceding has been a description of the preferred embodiment of the invention. It will be appreciated that deviations and modifications can be made without departing from the scope of the invention, which is defined by the appended claims.

What is claimed is:

1. A computer-implemented method of duplicating data in a system provided with a first storage subsystem group, comprising a first plurality of storage subsystems, and a second storage subsystem group, comprising a second plurality of storage subsystems, wherein the storage subsystems of the second storage subsystem group store copies of the data of the first storage subsystem group, wherein each of the storage subsystems of the first storage subsystem group writes the data into a storage device of the first storage subsystem group, assigns a serial number and a time, and transfers the data through a transmission line to at least one of the storage subsystems of the second storage subsystem group, and wherein a plurality of data received by each of the storage subsystems of the second storage subsystem group is arranged sequentially based on the serial numbers, and wherein an oldest time is decided from among a plurality of latest times by each of storage subsystems of the second storage subsystem group, each latest time being related to the plurality of data arranged based on the serial numbers, each latest time being communicated for comparison between at least some of the storage subsystems of the second storage subsystem group, and wherein data that is related to a time not later than the decided oldest time are selected as data to be written to the storage device of each of the storage subsystems of the second storage subsystem group, wherein one of the storage subsystems of the second storage subsystem group is a predetermined storage subsystem and each of the storage subsystems, other than the predetermined storage subsystem, notifies the predetermined storage subsystem of a latest time of data from the other storage subsystems, and the predetermined storage subsystem decides the oldest time from among the latest time of data in each of the other storage subsystems and a latest time of data stored in the predetermined storage subsystem.

2. The method of duplicating data as claimed in claim 1, wherein said transmission line that connects a storage subsystem which belongs to said first storage subsystem group and a storage subsystem which belongs to said second storage subsystem group comprises a Storage Area Network (SAN).

3. The method of duplicating data as claimed in claim 1, wherein a clock providing said time to each of the storage subsystems of said first storage subsystem group is corrected by an external source of time information.

4. The method of duplicating data as claimed in claim 1, wherein connections among the storage subsystems of said second storage subsystem group are made by loop transmission lines, and wherein each of the storage subsystems informs other storage subsystems of a latest time for comparison from among times associated with individual data copies stored within said storage subsystem, and thereupon, an oldest time is determined from among the latest times of each of the storage subsystems in said second storage subsystem group.

5. The method of duplicating data as claimed in claim 1, wherein a plurality of storage subsystems of said first storage subsystem group transfer each of writing data to one of the storage subsystems of said second storage subsystem group, the one of the storage subsystems of the second storage subsystem group selects the latest time that is given to each of said storage subsystems of the first storage subsystem group and decides the oldest time from among the selected latest times.

6. The method of duplicating data as claimed in claim 1, wherein a storage device of said storage subsystem is comprised of volumes and a volume pair is comprised of a volume of the first storage subsystem group and a volume of the second storage subsystem group, the storage subsystem which belongs to the first storage subsystem group controls a start and a stop of data transmission to the second storage subsystem group with the unit of each of the volume groups comprised of a plurality of volume pairs.

7. A data duplicating system, comprising:
a first storage subsystem group comprising a plurality of first storage subsystems; and
a second storage subsystem group comprising a plurality of second storage subsystems that store copies of the data of the first storage subsystem group,
wherein each of the first storage subsystems comprises a means of writing data to a storage device thereof, a means of giving a serial number and a time to said data, a means of transmitting said data with the serial number and the time through a transmission line to one of the second storage subsystems,
wherein each of the second storage subsystems comprises a means for arranging the received plurality of data in sequence based on said serial numbers, a means for deciding an oldest time from among a plurality of latest times associated with the second storage subsystems by comparing the latest time from at least some of the second storage subsystems with other second storage subsystems, and a means of writing the data with a time not later than a decided oldest time to a storage device of each of the second storage subsystems, each latest time in a second storage subsystem being related to the times of the plurality of data arranged based on the associated serial numbers, wherein one of the second storage subsystems is a predetermined storage subsystem and each of the second storage subsystems, other than the predetermined storage subsystem, notifies the predetermined storage subsystem of a latest time of data, and the predetermined storage subsystem decides the oldest time from among the latest time of data from the other second storage subsystems and a latest time of data stored in the predetermined storage subsystem.

8. A data duplicating system as claimed in claim 7, wherein said transmission line comprises a Storage Area Network (SAN).

9. A data duplicating system as claimed in claim 7, wherein each of the first storage subsystems is provided with a means for correcting a clock for referring to said time from external time information.

10. A data duplicating system as claimed in claim 7, wherein connections among the second storage subsystems are made by a loop transmission line and each of the second storage subsystems transfers an older of its latest time and a latest time received from another of the second storage subsystems to an adjacent one of the second storage subsystems, the data duplicating system further comprising means of deciding the time transferred by the second storage subsystem and returned to the second storage subsystem as said oldest time.

11. A data duplicating system as claimed in claim 7, wherein one of the second storage subsystems is configured as a master storage subsystem, each of the second storage subsystems other than said master storage subsystem comprises a means of notifying its latest time to the master storage subsystem and said master storage subsystem is provided with the means of deciding said oldest time from among its latest time and the latest times received from second storage subsystems other than said master storage subsystem.

12. A data duplicating system as claimed in claim 7, wherein a plurality of the first storage subsystems are comprised to transfer each of the writing data to one of second the storage subsystems and said one of the second storage subsystems comprises a means of selecting a latest time given to each of said first storage subsystems and a means of determining an oldest time from among the selected latest time as the candidates of said oldest time.

13. A data duplicating system as claimed in claim 7, wherein the first and second storage subsystem groups each comprises a plurality of volumes, wherein a volume of the first storage subsystem group is a source of copying and a volume of the second storage subsystem group is destination of copying and together form a volume pair, wherein one of the first storage subsystems is provided with a means for controlling the start and stop of the data transmission between volumes of a volume pair.

* * * * *